(12) United States Patent
Bigelow, Jr.

(10) Patent No.: US 6,225,895 B1
(45) Date of Patent: May 1, 2001

(54) TOWED VEHICLE MONITOR SYSTEM

(76) Inventor: Floyd E. Bigelow, Jr., 18003 Spellbrook, Houston, TX (US) 77084

( * ) Notice: Subject to any disclaimer, the term of this patent is extended or adjusted under 35 U.S.C. 154(b) by 0 days.

(21) Appl. No.: 09/320,350

(22) Filed: May 26, 1999

(51) Int. Cl.[7] .................................................. B60C 23/00
(52) U.S. Cl. ........................... 340/442; 340/443; 340/444
(58) Field of Search ................................... 340/442, 443, 340/444

(56) References Cited

U.S. PATENT DOCUMENTS

| 5,274,432 | * | 12/1993 | Parent | 356/138 |
| 5,327,116 | * | 7/1994 | Davidson | 340/443 |
| 5,486,807 | * | 1/1996 | Price | 340/443 |
| 5,520,045 | * | 5/1996 | Edri | 73/146 |
| 5,583,481 | * | 12/1996 | Gardner | 340/442 |
| 5,936,519 | * | 8/1999 | Nakajima et al. | 340/444 |
| 6,037,863 | * | 3/2000 | Collins | 340/443 |

* cited by examiner

*Primary Examiner*—Daniel J. Wu
*Assistant Examiner*—Tai T. Nguyen
(74) *Attorney, Agent, or Firm*—Guy McClung

(57) ABSTRACT

A system has been invented for monitoring at least one tire of a towed vehicle, the system in one aspect using mechanical indicators in conjunction with appropriate electrical wiring circuits and lights or other warning apparatus at a driver's position in a towing vehicle to signal the lowering of a tire due to loss of air pressure in the tire. Certain embodiments of such a system do not require the use of a monitoring camera and related video apparatus. In other systems according to the present invention, one or more cameras are used to provide a real-time view of either the tire(s) of a towing vehicle, tire pressure indicator(s), or both.

16 Claims, 4 Drawing Sheets

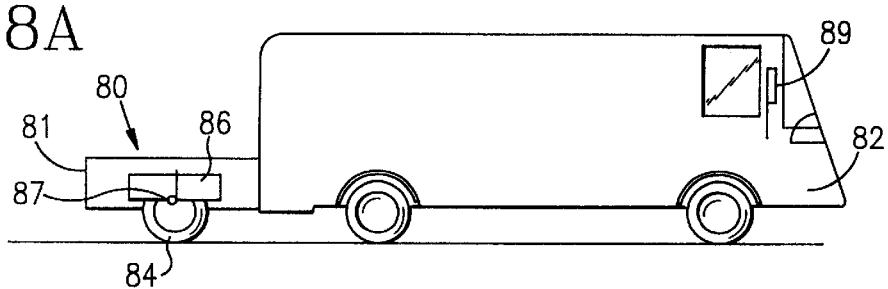
FIG. 8A
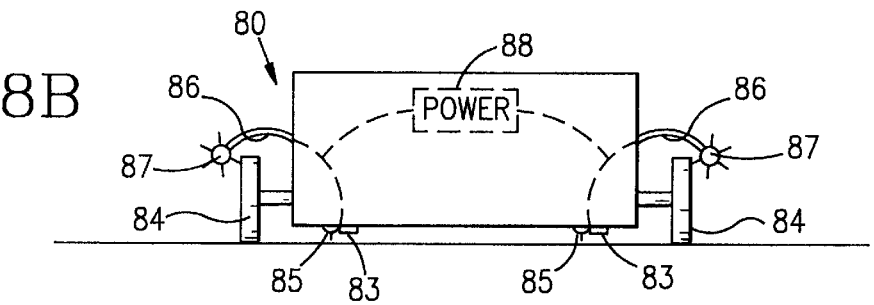
FIG. 8B
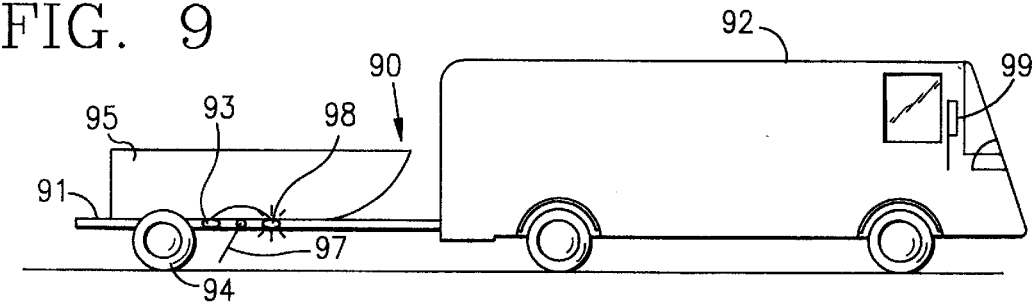
FIG. 9
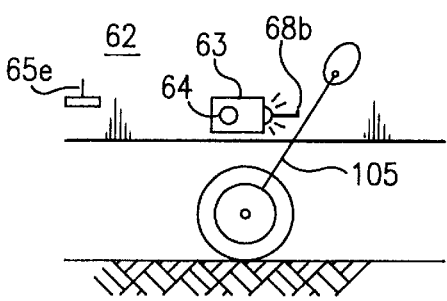
FIG. 10
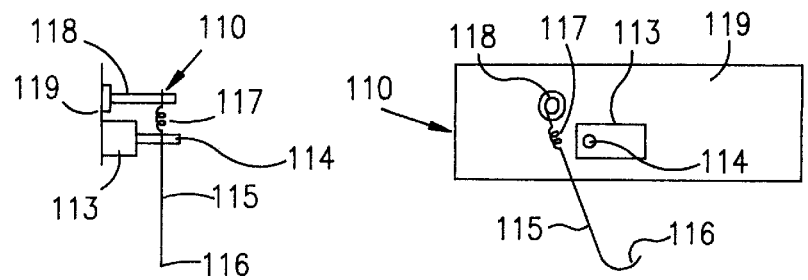
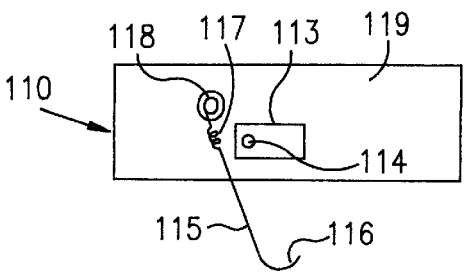
FIG. 11A          FIG. 11B

TOWED VEHICLE MONITOR SYSTEM

BACKGROUND OF THE INVENTION

1. Field of the Invention

This invention is directed to a monitor system for monitoring a vehicle towed behind a towing vehicle; and, in one particular aspect, to such a system that uses one or more tire pressure indicators and/or one or more monitoring cameras to monitor tire inflation of one or more tires of the towed vehicle.

2. Description of Related Art

FIG. 1 shows a prior art system for monitoring a towed vehicle T towed behind a towing vehicle V. The system includes one or more monitoring cameras C mounted at a level above the towed vehicle T. Appropriate wiring W and electronics E provide for viewing of what is seen by the camera(s) on a screen S in a cab C of the towing vehicle V, e.g. viewing by a passenger or driver of the vehicle V. The camera(s) C are mounted in such a way that they cannot see tires R of the towed vehicle V. Hence, the camera(s) do not see a damaged tire, a deflating tire, or a flat tire.

There has long been a need, recognized by the present inventor, for a system for monitoring of the condition of the tires of a vehicle being towed behind a towing vehicle. There has long been a need for such a system that permits real-time viewing of such tire condition.

SUMMARY OF THE PRESENT INVENTION

The present invention discloses in certain embodiments, a system for monitoring at least one tire of a towed vehicle, the system in one aspect using mechanical indicators in conjunction with appropriate electrical wiring circuits, batteries, and/or power sources, and lights (on a towed vehicle and/or on or in a towing vehicle) or other warning apparatus at a driver's position in a towing vehicle to signal the lowering of a tire due to loss of air pressure in the tire. Certain embodiments of such a system do not require the use of a monitoring camera and related video apparatus. In other systems according to the present invention, one or more cameras in a camera system are used to provide a real-time view of either the tire(s) of a towing vehicle, tire pressure indicator(s), or both.

The present invention, in certain aspects, discloses a system for monitoring at least one tire of a towed vehicle, the system including a towed vehicle connectible to and towable by a towing vehicle, the towed vehicle having a plurality of tires, at least one video camera on the towed vehicle, said at least one camera positioned for viewing at least one of the plurality of tires of the towed vehicle.

The present invention, in certain embodiments, discloses a system for monitoring the inflation of one, two, three, four or more tires of a vehicle being towed behind a towing vehicle. In certain embodiments one, two or more monitoring cameras are mounted on the tow vehicle, the towed vehicle, or both. The camera(s) is/are positioned to focus on one or more tires of the towed vehicle. Appropriate wiring links the camera(s) to electronics and interconnected screen viewable by a person within the tow vehicle.

In one aspect the screen is on or near a dashboard of the tow vehicle where a driver of the tow vehicle can view the screen while driving.

In one particular aspect a movable camera is used (either on the tow vehicle or the towed vehicle, or both) which can be moved from a remote location, e.g. the driver seat of a tow vehicle, to focus on one tire after another of the towed vehicle.

It is, therefore, an object of at least certain preferred embodiments of the present invention to provide:

New, useful, unique, efficient, nonobvious monitor systems for monitoring from a tow vehicle inflation condition of one or more tires of a towed vehicle; and Such a system wherein at least one monitoring camera is mounted on a tow vehicle, a towed vehicle, or both, so that it can view and focus on at least one tire of the towed vehicle.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 8A is a side view of a system according to the present invention. FIG. 8B is an end view of the system of FIG. 8A.

FIG. 9 is a side view of a system according to the present invention.

FIG. 10 is a side view of an alternative embodiments of the system as shown in FIG. 6B.

FIG. 11A is an end view and FIG. 11B is a side view of an alternative embodiment of the part of a system as in FIG. 6B.

DESCRIPTION OF EMBODIMENTS PREFERRED AT THE TIME OF FILING FOR THIS PATENT

Figure 2A:
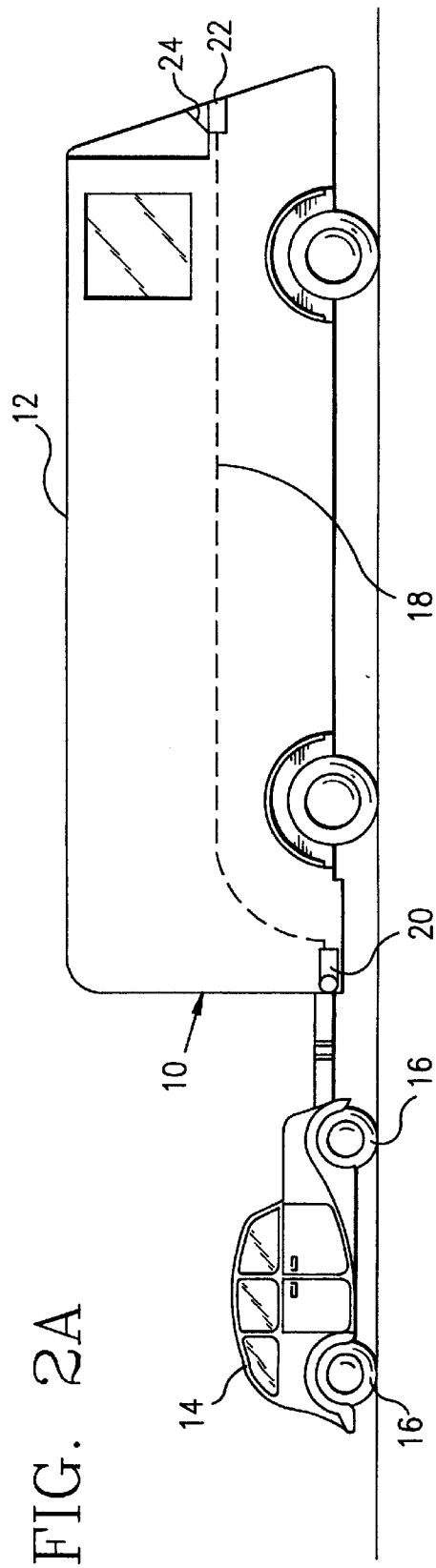
FIG. 2A is a side view of a system according to the present invention.
Figure 2B:
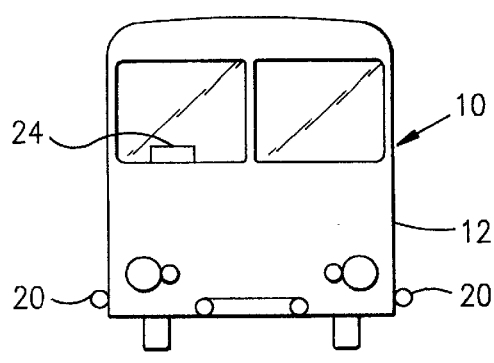
FIG. 2B is an front view and FIG. 2C is a partial top view of the system of FIG. 2A.
Figure 2C:
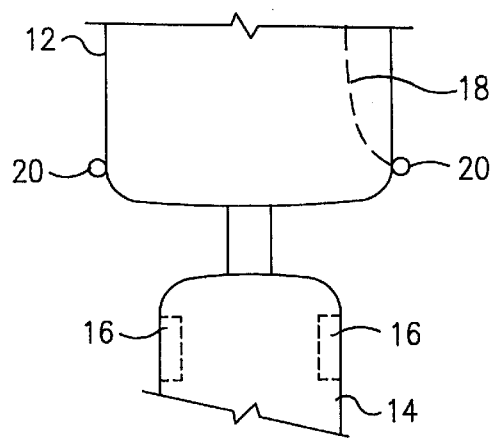

FIGS. 2A–2C show a system 10 according to the present invention that has a motorized towing vehicle 12 towing a towed vehicle 14. It is to be understood that "towing vehicle" includes, but is not limited to, any truck, motor coach, automobile, or prime mover that tows a towed vehicle. It is to be understood that "towed vehicle" includes, but is not limited to any towed vehicle such as an automobile, trailer, truck, motorcoach, mobile home, etc.

The system 10 has two side-mounted cameras 20 mounted near the rear of the towing vehicle 12 and positioned so that each of them has within its field of view tires 16 on one side of the towed vehicle 12. Either camera is optional and one of them may be deleted.

Appropriate electrical/electronic wiring 18 interconnects the camera(s) 20 and video electronic apparatus 22 that includes a screen 24 selectively viewable by a driver or passenger of the towing vehicle 12. Selection of one camera's view or the other may be chosen, or a split screen that provides each camera's view simultaneously. The screen 24 may be positioned anywhere in the towing vehicle 12 where it can be easily viewed by a person in the towing vehicle 12.

Figure 3A:
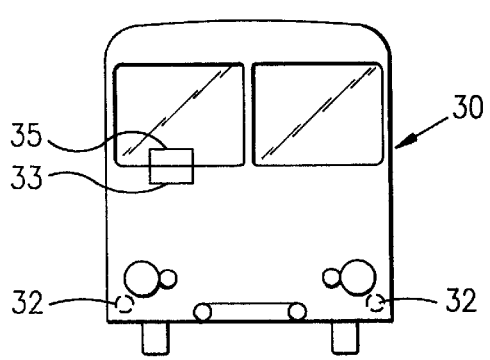
FIG. 3A is a front view and FIG. 3B is a partial top view of a system according to the present invention.
Figure 3B:
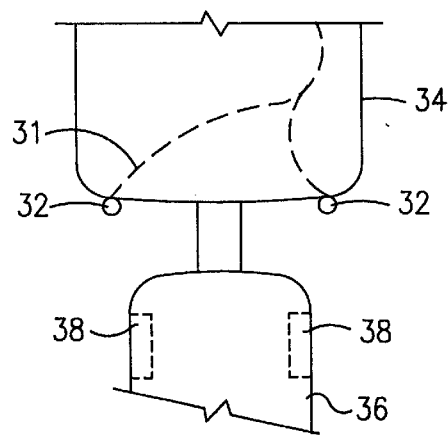

FIGS. 3A and 3B show a system 30, like the system 10, but with cameras 32 mounted on the rear of a towing vehicle 34 that is towing a towed vehicle 36. Each camera has in its field of view and line of sight two tires 38 of the towed vehicle 34. Wiring 31 (like the wiring 18), electronic apparatus 33 (like the apparatus 22), and a screen 35 (like the screen 24) provide a view of the tires 36 to a person in the towing vehicle 34.

Figure 4:
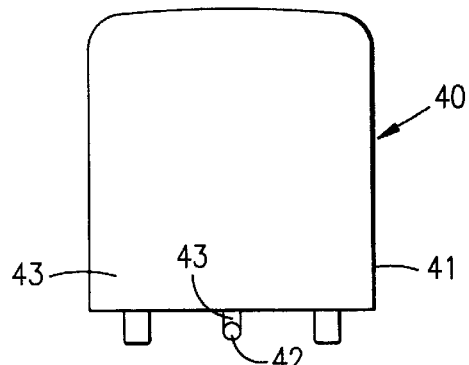
FIG. 4 is an end view of a towing vehicle of a system according to the present invention.

FIG. 4 shows a system 40 according to the present invention with a towing vehicle 41 for towing a towed vehicle (not shown). The vehicle 41 has a camera 42 mounted at the rear 43 of the vehicle 41. The camera 42 is mounted at such a level that included in its field of view are the tires (4, 6, 8, etc.) of the towed vehicle. Optionally, a selectively rotatable mount 43 may be used with the camera 42 and controlled by a driver or passenger of the vehicle 41 for moving the camera 42 to selectively view one tire, two tires on one side of the towed vehicle, or all four tires thereof. Such a camera and mount may also be used on a towed vehicle mounted for viewing the towed vehicle's tires and/or tires of the towing vehicle. Appropriate wiring etc. as with the systems of FIGS. 2A and 3A permits viewing of tire(s) in the towing vehicle and, if the mount 43 is used, selective moving of the camera 42 from within the towing vehicle.

Figure 5:
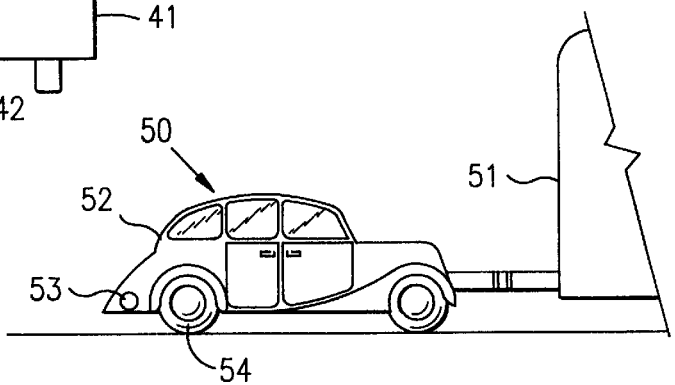
FIG. 5 is a side view of a system according to the present invention.

FIG. 5 shows a system 50 according to the present invention with a towing vehicle 51 (like the previously-described towing vehicles; shown partially) and a towed vehicle 52. A camera 53 is mounted on the towed vehicle 52 to view two tires 54 of the towed vehicle 52. Optionally, another camera (not shown) may be mounted on the other side of the towed vehicle 52. One camera 53, either camera 53 or both may also be used to view a tire or tires of the towing vehicle. The system 50 includes wiring, electronic apparatus, and a screen (all not shown) as in the previously-described systems, with appropriate wiring and connections to the camera(s) 53.

Figure 6A:
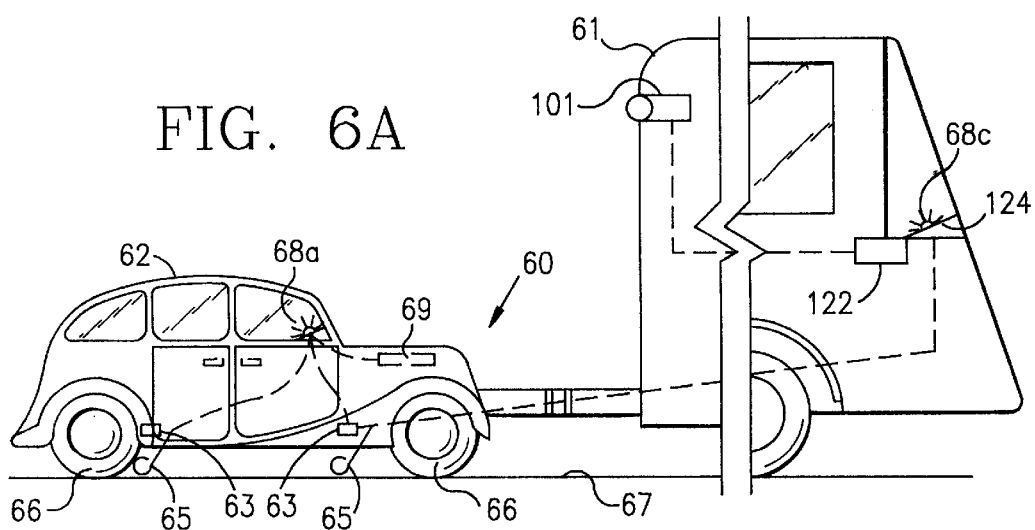
FIG. 6A is a side view of a system according to the present invention.
Figure 6B:
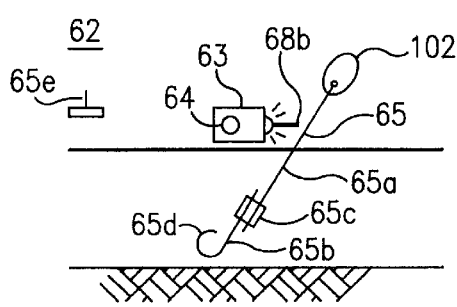
FIG. 6B is an enlargement of part of the system of FIG. 6A.
Figure 6C:
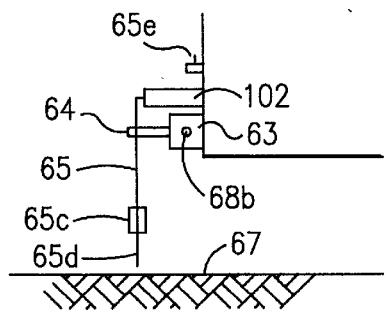
FIG. 6C is an end view of the part of the system of FIG. 6B.

FIG. 6A shows a system 60 according to the present invention with a towing vehicle 61 and a towed vehicle 62 (like any other vehicles described herein with the additional features discussed below). The towed vehicle 62 has at least one and preferably, as in the system 60, four switch apparatuses 63 with a movable switch 64 activated by a movable arm 65. Two of the switch apparatuses 63 are shown, one corresponding to each tire 66 on one side of the towed vehicle 62. There are two other switch apparatuses similarly located on the other side of the towed vehicle 62. The movable arms are, preferably, mounted vertically or inclined rearwardly (as in FIGS. 6A and 6B).

Figure 1:
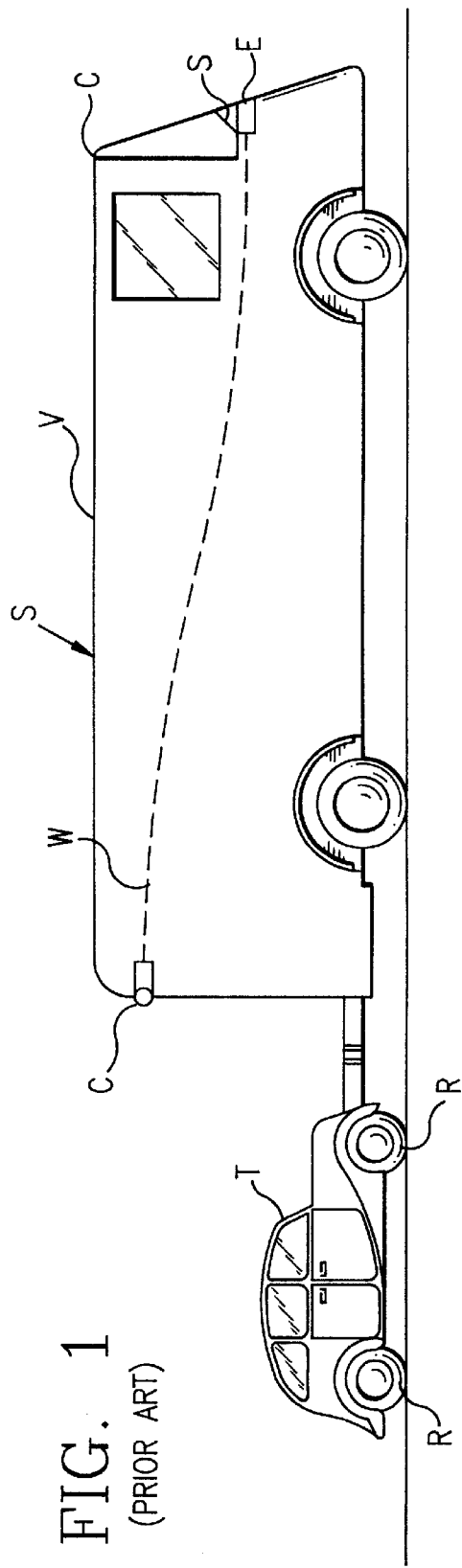
FIG. 1 is a side view of a prior art system for monitoring a towed vehicle.

When the air pressure in a tire 66 is reduced, due to a leak or blow out, the towed vehicle 62 is lowered toward the ground 67. When this occurs the arm or arms 65 contact the ground 67 and are moved to activate the switch apparatus or apparatuses 63. The switch apparatuses 63 are interconnected with an indicator (e.g. a horn, light, blinking light, etc. or combination thereof). In the system 60 as shown there are three indicators, any one or two of which may be optional. The indicators include a blinking and/or rotating light 68a mounted on the dash (or in any appropriate location on the towed vehicle, e.g. but not limited to on the hood, roof or trunk) of the towed vehicle 62; a blinking light 68b on the switch apparatus 63; and/or a blinking light 68c (or other indicator) on the dash of the towing vehicle 61. A battery 69 of the towed vehicle interconnected in the circuit with the indicator(s) and switch(es) can power the lights 68a and 68b, or individual batteries (on the towed vehicle, on the towing vehicle, or both) can be provided for the switch apparatus(es) 63. Alternatively, the battery of the towing vehicle may be used. An optional camera 101 (like the camera in the system of FIG. 1 or positioned, alternatively, like the cameras of the system of FIGS. 2A, 3A or 5) is positioned to monitor the indicator 68a and/or indicators 68b. Interconnection between the camera 101 electronic apparatus 122 (like the electronic apparatus 22, FIG. 2A), and a screen 124 (like the screen 24, FIG. 2A) provide a real-time view for a driver or passenger in the towing vehicle of the status of the indicator(s).

The movable arms 65 are secured to an arm mount 102 and are made of any suitable material, e.g. plastic, metal, fiberglass, spring(s), etc. As shown the arms 65 are made of a first piece 65a and a second piece 65b, each held in a connector 65c. This structure permits the total length of the arms 65 to be adjusted by changing the amount of the pieces extending through the connector 65c. The pieces can be held in the connector 65c by friction fit, threaded fit, or any appropriate securement that permits length adjustability. In one aspect a lowest end of the arms 65 has an open loop 65d that inhibits the end of the arm from getting caught or stuck in the ground or in a roadway. Such a loop may also be used for releasable emplacement over a loop holder 65e on the towed vehicle (when it is desired not to use the indicating system). Alternatively, when no loop is used the arm itself may be set on the loop holder when the system is not to be used. In one aspect the lowest end of the arms 65 is positioned between about 1 ½ inches to about 1 inches above the ground or roadway. In one aspect, for tires with a thickness of about three inches the end of the arm is positioned about one inch above the ground or roadway. In other aspects, it is preferred that the distance of the end of the arm above the ground or roadway is between about ⅓ to about ½ of the distance from the ground to the tire rim edge, i.e., about this fraction of the height of the tire from ground to rim edge. It is within the scope of this invention for the arms 65 to be electrical conductors that are a part of an electrical circuit so that when they are moved (e.g., upwardly with respect to a car body) they actually complete a circuit that includes the light(s), audio alarm(s), or other indicator(s) in the towing vehicle and/or on the towed vehicle.

Figure 7:
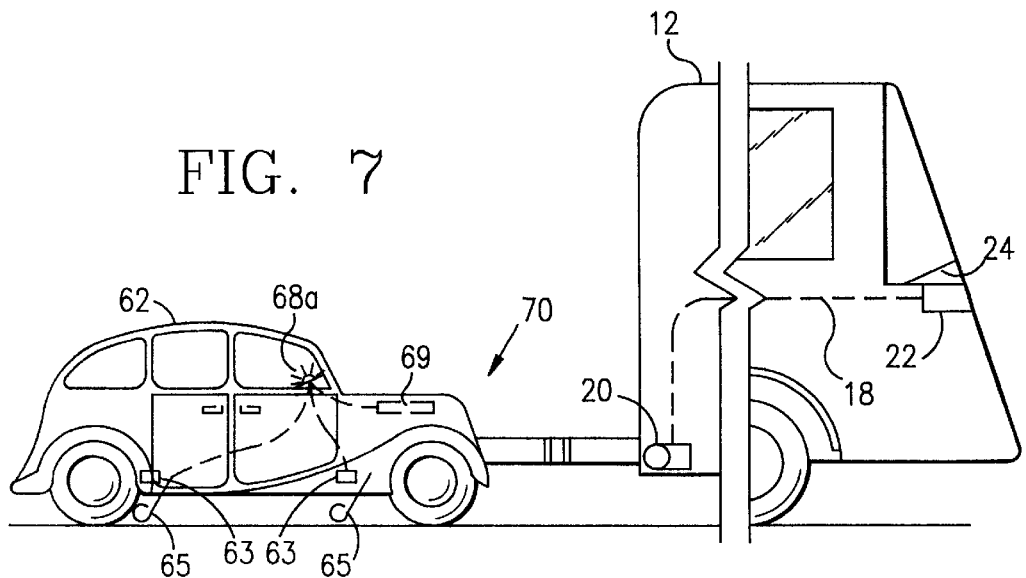
FIG. 7 is a side view of a system according to the present invention.

FIG. 7 shows a system 70 according to the present invention which is like the system 60, but with a towing vehicle 12 as in the system of FIG. 2A and a camera (or cameras) 20 for real-time viewing of the switch apparatuses 63 and indicators 68b on the screen 24.

FIGS. 8A and 8B show a system 80 according to the present invention with a towing vehicle 82 (like any towing vehicle described herein) with side mirrors 89 (one shown in FIG. 8A; another similar positioned on the opposite side of the towing vehicle) viewable by a driver of the towing vehicle 82.

The towing vehicle 82 tows a two-wheel trailer 81 with tires 84 under fenders 86. Two switch apparatuses 83 with corresponding movable arms 85 (like the switch/arm devices previously described are mounted to the underside of the trailer 82 (although side mounting as previously described is possible within the scope of this invention). Lights 87 are interconnected with the switch apparatuses 83 so that upon closing of a circuit including a power source 88, the lights 87, mounted on the fenders 86 are lit. The movable arms 85 move to operate a switch of the switch apparatuses 83 when a tire loses air pressure as described above for other embodiments. The driver of the towing vehicle sees the lights in the rear view side mirrors 89 and, when they are lit, the driver knows that a tire has lost air pressure. Optionally, the towing vehicle 82 may have any camera system described herein. Any other system described herein may have one or more mirrors for the driver to view one or more tire pressure indicators, lights, etc. instead of or in addition to a camera system. Any suitable power source may be used, including but not limited to: the power source for lights on the trailer; and/or a battery on the trailer and/or in the towing vehicle.

FIG. 9 shows a system 90 with a towing vehicle 92 (like the towing vehicle 82, FIG. 8A, and its possible embodiments) that tows a boat trailer 91 with a boat 95 thereon. The boat trailer 91 has tires 94. The towing vehicle 92 has two side mirrors 99 (one shown; like the side mirrors 89, FIG. 8A). A switch apparatus 93 on the trailer 91 is like the switch apparatuses 83 and 63 and others disclosed herein. A movable arm 97 with one end secured to the trailer 91 is like other movable arms described herein. When air pressure in a tire 94 is reduced, a movable arm 97 contacts the ground and moves to activate a switch of the switch apparatus 93, in turn turning on a light 98 which can be viewed by the vehicle driver in a mirror 99. The light 98 is powered by a power source (not shown) like the power source 88 (FIG. 8B). Optionally, any camera system disclosed herein may be used with the system 90 or instead of it.

FIG. 10 shows a switch apparatus 63 (as previously described) with a movable arm 105 (like the arm 65 without the loop end) to whose lower end is rotatably mounted a wheel or tire/wheel combination 104. The wheel or tire/wheel combination 104 rolls along the ground as the towed vehicle and towing vehicle move. Upon deflation of a tire adjacent the arm 105, the arm 105 moves up to activate a movable switch (as does the arm 65, FIG. 6B). The wheel or tire/wheel combination 104 is positioned so it does not impede the contact between the movable arm and the switch. Any arm disclosed herein may have such a wheel or tire/wheel combination.

FIGS. 11A and 11B disclose an alternative movable arm/switch device 110 according to the present invention. A switch apparatus 113 (like the switch apparatuses 63) has a movable switch 114 (like the movable switches 64). A movable arm 115 with a curved lower end 116 has an upper spring portion 117 secured to a bar or flange 118 that is secured to a towed vehicle, trailer, etc. 119. Any movable arm described herein may be like the arm 115 and all or part of any such arm may be a spring.

For either trailer in FIG. 8A and FIG. 9, one or more arm/switch devices may be used. In certain embodiments, one such device is used adjacent each tire (e.g. two-wheel trailer with two such devices; four-wheel trailer with four such devices; etc.). Alternatively, one such device (only) may be used on each side of a trailer (or one on each side of any towed vehicle, etc. disclosed herein, or on front and/or rear of a towed vehicle, etc.).

The present invention, therefore, provides in certain, but not necessarily all embodiments, a system for monitoring at least one tire of a towed vehicle, the system in one aspect using mechanical indicators in conjunction with appropriate electrical wiring circuits and lights or other warning apparatus at a driver's position in a towing vehicle to signal the lowering of a tire due to loss of air pressure in the tire. Certain embodiments of such a system do not require the use of a monitoring camera and related video apparatus. In other systems according to the present invention, one or more cameras are used to provide a real-time view of either the tire(s) of a towing vehicle, tire pressure indicator(s), or both.

The present invention, therefore, provides in certain, but not necessarily all embodiments, system for monitoring at least one tire of a towed vehicle, the system including a towing vehicle, a towed vehicle connected to and towed by the towing vehicle, the towed vehicle having a plurality of tires, at least one tire pressure indicator on the towed vehicle for indicating loss of air pressure in one of the plurality of tires, wherein the at least one tire pressure indicator includes switch apparatus mounted to the towed vehicle, the switch apparatus having a movable switch, movable arm apparatus having a first end spaced apart from a second end, the first end secured to the towed vehicle, the second end sized and positioned for moving the movable arm apparatus upon contact of the second end with ground to contact the movable switch of the switch apparatus, indicator apparatus in a circuit that includes the switch apparatus and an electrical power source, movement of the movable switch by the movable arm apparatus closing the circuit to activate the indicator apparatus, the indicator apparatus for giving an indication of lowering of the towed vehicle due to decreased air pressure in a tire thereof. Alternatively, the switch apparatus is deleted and the movable arm itself is used as an electrical conductor that completes the circuit.

The present invention, therefore, provides in certain, but not necessarily all embodiments, a system for monitoring at least one tire of a towed vehicle, the system having a towing vehicle, and/or a towed vehicle connected to and towed by the towing vehicle, the towed vehicle having a plurality of tires, at least one video camera on one of the towing vehicle or towed vehicle, said at least one camera positioned for viewing at least one of the plurality of tires of the towed vehicle, and, at least in certain aspects but not necessarily all, video apparatus with viewing apparatus, the video apparatus interconnected with or interconnectible with the at least one camera for providing to a person in the towing vehicle a view on viewing apparatus of the at least one tire of the towed vehicle. Such a system with one, some, or all of the following: wherein the at least one camera is on the towing vehicle; wherein the at least one camera is on the towed vehicle; wherein the plurality of tires of the towed vehicle includes two sets of tires of at least two tires each, one set on each of two sides of the towed vehicle; wherein the at least one camera is two spaced-apart cameras, one for viewing each of two sides of the towed vehicle and/or of the towing vehicle; wherein the at least one camera is movably mounted; wherein the towing vehicle is selected from the group consisting of automobile, truck, motorcoach, motorhome, and motorized prime mover; wherein the towed vehicle is selected from the group consisting of automobile, truck, trailer and mobilehome; and/or wherein the video apparatus includes wiring and/or connections, electronic apparatus interconnected with the at least one camera by the wiring and/or connections, and a screen viewable by a person in the towing vehicle and interconnected with the electronic apparatus for presenting a view of the at least one of the plurality of tires of the towed vehicle.

The present invention, therefore, provides in certain, but not necessarily all embodiments, a system for monitoring at least one tire of a towed vehicle, the system having a towing vehicle, a towed vehicle connected to and towed by the towing vehicle, the towed vehicle having a plurality of tires, at least one video camera on one of the towing vehicle or towed vehicle, said at least one camera positioned for viewing at least one of the plurality of tires of the towed vehicle, video apparatus with viewing apparatus, the video apparatus interconnected with the at least one camera for providing to a person in the towing vehicle a view on viewing apparatus of the at least one tire of the towed vehicle, the video apparatus including wiring, electronic apparatus interconnected with the at least one camera by the wiring, and the viewing apparatus having a screen viewable by a person in the towing vehicle and interconnected with the electronic apparatus, and wherein the plurality of tires of the towed vehicle includes two sets of tires of at least two tires each, one set on each of two sides of the towed vehicle.

The present invention, therefore, provides in certain, but not necessarily all embodiments, a system for monitoring at least one tire of a towed vehicle, the system having a towed vehicle connectible to and towable by a towing vehicle, the towed vehicle having a plurality of tires, at least one video camera on the towed vehicle, said at least one camera positioned for viewing at least one of the plurality of tires of the towed vehicle.

The present invention, therefore, provides in certain, but not necessarily all embodiments, a system for monitoring at least one tire of a towed vehicle having a plurality of tires, the system having a towing vehicle connectible to and for towing a towed vehicle having a plurality of tires, at least one video camera on the towing vehicle, said at least one camera positioned for viewing at least one of the plurality of tires of the towed vehicle.

The present invention, therefore, provides in certain, but not necessarily all embodiments, a method for viewing at least one tire of a towed vehicle behind a towing vehicle, the method including pointing at least one video camera of any system disclosed herein at at least one tire of a towed vehicle, and, optionally, sending with the video apparatus a signal indicative of a view of the at least one tire from the at least one camera to the viewing apparatus. Such a method may include monitoring each of two sets of tires of a towed vehicle with one of two spaced-apart cameras; and/or selectively moving the at least one camera on a movable mount to monitor a select one of the at least one tire of the towed vehicle.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A system for monitoring at least one tire of a towed vehicle, the system comprising
   a towing vehicle,
   a towed vehicle connected to and towed by the towing vehicle, the towed vehicle having a plurality of tires,
   at least one tire pressure indicator on the towed vehicle for indicating loss of air pressure in one of the plurality of tires,
   at least one video camera on one of the towing vehicle or towed vehicle, said at least one camera positioned for viewing in real-time the at least one tire pressure indicator,
   video apparatus with viewing apparatus, the video apparatus interconnected with the at least one camera for providing to a person in the towing vehicle in real-time a view on viewing apparatus of the at least one tire pressure indicator of the towed vehicle,
   the at least one tire pressure indicator including switch apparatus mounted to the towed vehicle,
   the switch apparatus having a movable switch; movable arm apparatus having a first end spaced apart from a second end, the first end secured to the towed vehicle, the second end sized and positioned for moving the movable arm apparatus upon contact of the second end with ground to contact the movable switch of the switch apparatus; indicator apparatus in a circuit that includes the switch apparatus and an electrical power source, movement of the movable switch by the movable arm apparatus closing the circuit to activate the indicator apparatus, the indicator apparatus for giving an indication of lowering of the towed vehicle due to decreased air pressure in a tire thereof.

2. The system of claim 1 wherein the at least one camera is on the towing vehicle.

3. The system of claim 1 wherein the at least one camera is on the towed vehicle.

4. The system of claim 1 wherein the indicator apparatus includes a light on the towed vehicle.

5. The system of claim 1 wherein the indicator apparatus includes a light in the towing vehicle.

6. The system of claim 1 wherein the indicator apparatus includes a light on the switch apparatus.

7. The system of claim 1 wherein the movable arm apparatus is length-adjustable.

8. The system of claim 1 wherein the movable arm apparatus is movable away from a lower side of the towed vehicle and releasably securable to the towed vehicle.

9. The system of claim 1 wherein the electrical power source is on the towed vehicle.

10. The system of claim 1 wherein the at least one camera is two spaced-apart cameras, one for viewing each of two sides of the towed vehicle.

11. The system of claim 1 wherein the at least one camera is movably mounted.

12. The system of claim 1 wherein the towing vehicle is selected from the group consisting of automobile, truck, motorcoach, motorhome, and motorized prime mover.

13. The system of claim 1 wherein the towed vehicle is selected from the group consisting of automobile, truck, trailer and mobilehome.

14. The system of claim 1 wherein the video apparatus includes wiring, electronic apparatus interconnected with the at least one camera by the wiring, and a screen viewable by a person in the towing vehicle and interconnected with the electronic apparatus for presenting a view of the at least one of the plurality of tires of the towed vehicle.

15. The system of claim 1 further comprising
 a wheel for contacting the ground, the wheel rotatably mounted to the second end of the movable arm apparatus.

16. The system of claim 15 further comprising
 a tire on the wheel.

* * * * *